United States Patent [19]

Kuhlman et al.

[11] Patent Number: 4,910,090
[45] Date of Patent: Mar. 20, 1990

[54] EMI/RFI SHIELD FOR VISUAL DISPLAY TERMINALS

[75] Inventors: Bruce E. Kuhlman, Redwood City; Gerald R. Behling, Santa Clara; James E. Kloss, Sunnyvale, all of Calif.

[73] Assignee: Southwall Technologies, Inc., Palo Alto, Calif.

[21] Appl. No.: 111,201

[22] Filed: Oct. 21, 1987

[51] Int. Cl.⁴ .................................. H04N 5/65
[52] U.S. Cl. ......................... 428/469; 174/35 MS; 358/247; 358/252; 428/457
[58] Field of Search ............ 428/411.1, 469, 457; 358/252, 253, 255, 247; 174/35 MS, 35 GC; 350/276 SL

[56] References Cited

U.S. PATENT DOCUMENTS

| | | | |
|---|---|---|---|
| 3,431,348 | 3/1969 | Nellis et al. | 174/35 GC |
| 4,322,276 | 3/1982 | Meckel et al. | |
| 4,412,255 | 10/1983 | Kuhlman et al. | 358/252 |
| 4,471,015 | 9/1984 | Ebneth et al. | 174/35 MS |
| 4,628,365 | 12/1986 | Carlton | 358/253 |
| 4,670,347 | 6/1987 | Lasik et al. | 174/35 MS |

OTHER PUBLICATIONS

West, (May 1988) Boating Industry, pp. 88–90.
EMI Shielding Products Catalog 1988, pp. 1–4.

*Primary Examiner*—Paul J. Thibodeau
*Attorney, Agent, or Firm*—Irell & Manella

[57] ABSTRACT

A multilayer composite EMI/RFI filter for use in front of visual displays is disclosed to be constructed of a shaped or shapable plastic substrate having an outer diffuse hardcoat and one or more conductor transmissive layers of metal. Preferably the metal is presented as a sputter-deposited dielectric-metal-dielectric stack.

13 Claims, 1 Drawing Sheet

EMI/RFI SHIELD FOR VISUAL DISPLAY TERMINALS

BACKGROUND OF THE INVENTION

1. Field of the Invention.

This invention relates to an improved electromagnetic interference (EMI)/radio frequency interference (RFI) shield. This shield is placed in front of visual display terminal screens.

2. Prior Activities in the Field.

There is an ever increasing need for EMI/RFI shields for visual display terminal screens. These screens are commonly cathode ray tubes but also can be flat panel devices. The need for these filters arises from several fronts. For one, there are health concerns regarding operators being exposed to EMI and RFI radiation emanating from the display devices. For another, there is concern over interference from one device to another from the EMI/RFI radiation they each emit. Another growing concern is the need for security within computers and other systems which employ visual display terminal screens and the recognition that computers and the like can be probed through the screens.

While it is possible to shield most areas of these devices by enclosing them in a conductive shield such as a wire mesh shield or metal box, shielding the display surface itself where visual clarity is important can be more difficult. Heretofore, wire mesh based shields have been proposed for the display surfaces. While these generally work acceptably with monochrome systems, with color displays, which employ a dot matrix style of display, wire mesh can seriously degrade signal patterns by creating moire patterns. This interference can also lead to color shifts.

Glass panel shields with transparent metal coatings have been proposed as well. These materials have a transparent substrate with a layer of metal on one surface. They have numerous failings. For one, the panels are extremely costly and difficult to work with because of their glass construction. For another, such panels tend to be thick and heavy.

Representative disclosures relative to EMI/RFI shielding and to the use of shielding in security environments includes:

U.S. Pat. 4,412,255 issued 25 Oct. 1983 to Bruce E. Kuhlman and Marc A. Kamerling.

As will be apparent from the foregoing, there is a well recognized need for a high efficiency EMI/RFI shield for use with visual display terminals. The prior art has not supplied such a shield and it is the object of this invention to do so.

STATEMENT OF THE INVENTION

An improved class of EMI/RFI filters for use in front of visual display terminals has now been found. These filters are multilayer composites. Beginning with the outer layer, that is the layer closest to the viewer or furthest from the display surface, the composite has a diffuse nonglare hard-coat. This hard-coat is a transparent, scratch resistant surface generally from about 3 to 10 microns in thickness. The next layer is a sheet of plastic having a thickness of from about 1 to about 50 mils. This plastic is shaped and thermally formed as needed to conform to the face of the display device. The next innermost layer itself comprises a stack of dielectric and metal layers. This can be in a dielectric-metal-dielectric configuration or can include more than one metal layer sandwiched between dielectrics. The thickness of these layers can be expressed in terms of their electrical resistivity. (Thinner layers have higher resistivity and thicker layers have lower resistivity.) Using this measurement scheme, the metal layers should have a resistance of 20 ohms or less. These metal layers are electrically connected to grounding sources. This connection generally occurs on substantially all 360° of the circumference of the shield. The shields are further characterized by their optical transparency in combination with the above noted conductivity. Typical transparencies are 25% or greater over the visual range.

In an alternative embodiment, the EMI/RFI shield can contain an additional dielectric-metal-dielectric stack on the other side of the plastic substrate.

In another aspect, this invention provides a method for preparing the above described shields. This process comprises the steps of: (a) coating one surface of the plastic substrate with a diffuse hard-coat; (b) coating by sputter deposition the other surface of the plastic with the multilayer conductivity stack, and thereafter shaping and molding the plastic sheet to conform to the display.

DETAILED DESCRIPTION OF THE INVENTION

Description of the Drawing

The EMI/RFI filters of this invention will be further described with reference being made to the accompanying drawing in which.

Description of Preferred Embodiments

The present invention provides an EMI/RFI shield which combines high visual transmittance with high electrical conductivity and concomitant high shielding efficiency. This shielding efficiency is high enough to permit the products of this invention to be certified as Tempest filters.

Figure 1:
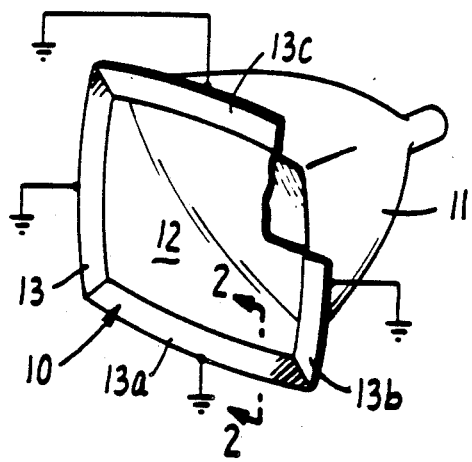
FIG. 1 is a perspective partially cut away view illustrating the placement of a shield of this invention in front of a visual display screen.

Turning now to FIG. 1, a shield of this invention 10 is shown positioned in front of a cathode ray tube 11. Shield 10 is formed to conform to the face of tube 11. This forming generally is a three dimensional forming. Shield 10 includes a transparent center portion 12 and grounding connectors 13, 13a, 13b, and 13c. These grounding connectors essentially completely surround the transparent region of the shield 10 (that is, provide 360° grounding). In actual practice, the back region of the CRT and the remainder of the display unit would be surrounded by a grounding shield as well. For brevity this is not shown in FIG. 1.

Figure 2:
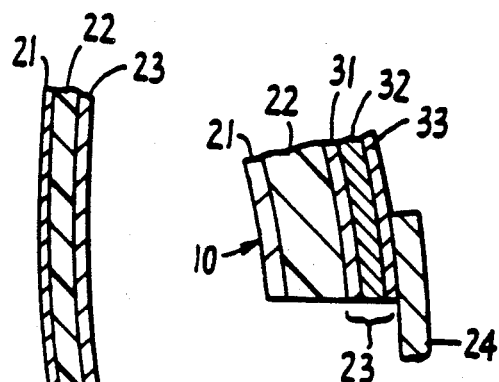
FIG. 2 is an expanded scale cross sectional scale view of a shield of this invention.

Turning to FIG. 2, a cross-sectional view of the shield of this invention is shown. The shield 10 includes at minimum a diffuse nonglare hard-coat 21, a transparent plastic substrate 22, and an electrically conductive metal-metal oxide layer 23. Also shown in FIG. 2 is a grounding conductor 24, electrically connected to conductor layer 23, and in turn electrically connected to conductor 25 which goes to ground; 24 and 25 are functionally identical to conductor 13 in FIG. 1.

Diffuse hard-coat 21 is provided to enhance resistance to abrasion. Generally, in use this layer is accessible to the operator of the display terminal and can be touched with hands and the like. Therefore, the diffuse hard-coat serves an important function by minimizing damage by the operator. Diffuse hard-coat 21 can, for example, be a cured silica hard-coat or an acrylic-based hard-coat. These types of hard-coats present a relatively mat finish. This serves to reduce specular reflections off of the outer surface of the shield to levels of 0.1 or lower, by scattering ambient light. They also serve to reduce fingerprinting when the panel is touched. The amount of antireflective hard-coat should be in the range of from about 0.5 to about 20 mils, preferably from about 1 to about 10 mils, and more preferably from about 1.5 to about 8 mils. Examples of typical hard-coats include the Dyalex material sold by MPV and applied by the process of Rollcoating and the Marnot material sold by Terra and applied by the process of Rollcoating.

The shield 10 has a flexible plastic substrate 22. This can be formed of plasticized polymer such as poly(carbonate), poly(ester), poly(olefin), poly(ether sulfone), or the like. Poly(carbonate) and the poly(ester) poly(ethylene terphthalate) (PET) are preferred plastic substrates because of their toughness and resistivity to chemicals and the like. Plastic substrate 22 has a thickness of from about 1 to about 50 mils. If desired it can be thicker. Preferably the substrate has a thickness of from about 2 to about 25 mils and more preferably from about 5 to about 20 mils. Substrate 21 can be clear or it can be tinted or pigmented. This can be done to give a color to light coming through the shield or to provide enhanced definition to figures shown on the screen. For example, neutral grey is often used for contrast enhancement and green and orange are often used to impart particular colors to transmissions. This tinting can be carried out by incorporating the color or pigment in the plastic substrate itself or by applying the color as a layer on the plastic. Generally the transmission over the visual range desired for the shields of this invention can be achieved when the plastic substrate has transmittance values of between 30% and 100%. Generally, it has been found that when the transmittance values are below about 30% this in combination with the diminished transmittance imparted by the conductive metal layer leads to an unacceptably low overall transmittance. When the plastic substrate is treated to reduce its transmittance this is more commonly done to yield a transmittance of from about 35 to about 95% and preferably from about 40 to about 80%. Absorbance can be imparted to plastic substrate 22 by any of the methods known in the art for reducing light transmittance, including, without limitation, pigmenting or dyeing substrate 22, applying a pigment or dye overcoat, imparting circular polarizing properties to the plastic layer, or the like. For simplicity, ease of handling and durability, pigmenting the plastic substrate is the generally preferred method of reducing transmittance.

Figure 3:
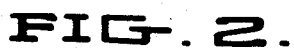
FIG. 3 is an expanded scale cross sectional view of the filter material illustrating its various layers.

The inner surface of substrate 22 carries a transparent electrically conductive layer 23. Layer 23 is itself made up of more than one layer, as is shown in more detail in FIG. 3. In FIG. 3, 21 is the diffuse hardcoat, 22 is the plastic substrate, and layer 23 includes dielectric layer 31, metal layer 32, and dielectric layer 33. This form of conductor offers significant advantages over a conventional metallic conductor such as a metallic screen or the like in that it cannot generate interfering moire patterns and has significant optical transparency. This multilayer stack has a total thickness of from about 500 angstroms to about 2,000 angstroms. The metal layer 32 is formed of a conductive metal and is from about 100 angstroms to about 500 angstroms in thickness. Representative metals include silver, gold, copper, nickel, mixtures thereof, and the like. The dielectric layers are independently selected and are generally from about 100 angstroms to 1,000 angstroms in thickness. Representative dielectrics include metal oxides such as titanium dioxide, lead oxide, tin oxide, bismuth oxide, zirconium oxide, iron oxide, indium oxide, and the like, as well as metal sulfides such as zinc sulfide. These dielectric-metal-dielectric sandwiches can be also characterized by having transmittances of from about 30% to about 80%, and especially from about 40% to about 80%.

An important characteristic of the metal layer which directly relates to its performance as an EMI/RFI shield is its substantial electric conductivity. This layer should have a conductivity as measured by resistance, of less than 20 ohms per square, preferably it has a conductivity of 5 ohms or less per square, and more preferably has a conductivity of 1 ohm per square or less.

Conductive layer 23 is again joined to conductor 24 for grounding. This connection can be carried out by the use of conductive ink buss bars, by metal contacts, or the like. It will be noted that conductor 24 is shown contacting dielectric layer 33. One might infer that this does not represent a good electrical connection since layer 33 is dielectric. In fact, the methods of connection just described have the property of permeating through the dielectric so that the connection of 24 will in fact contact the conductive layer 32.

Figure 4:
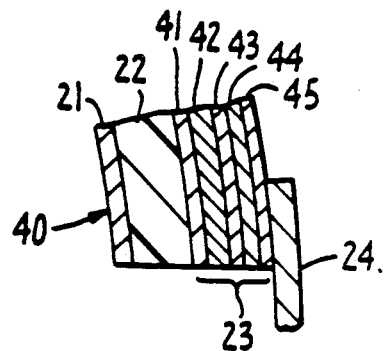
FIG. 4 is a similar view showing an alternative embodiment of the invention.

Turning to FIG. 4, yet another embodiment of the invention is shown. In this embodiment hard-coat 21 and plastic substrate 22 and conductor 24 are as previously described. In this embodiment, however, conductive layer 23 is made up of a five layer stack including dielectric layers 41, 43, and 45, and multiple metal layers 42 and 44. This embodiment has the advantage that larger amounts of conductive metal can be applied in two layers rather than one, and yet achieve the same high degree of transmissivity. In this embodiment, generally layers 41 and 45 are independently selected in the 100 angstrom to 1,000 angstrom range, while layer 43 is somewhat thicker than layers 41 and 45. The two metal layers, 42 and 44, may be the same or different, and are in total from about 100 to about 700 angstroms in thickness.

Although not shown, this multilayer stack concept as shown in FIG. 4 can be expanded further to include three, four, or more layers of metal, each separated from the other by a dielectric layer.

Figure 5:
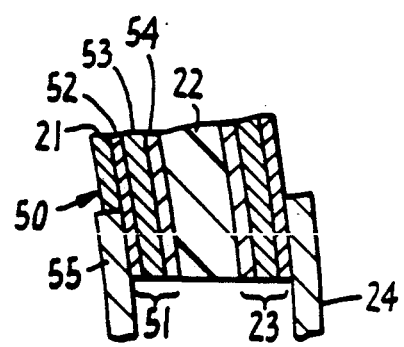
FIG. 5 is a similar view of yet another alternative embodiment of the invention having two shielding layers.

Turning to FIG. 5, yet another embodiment 50 is shown. Embodiment 50 includes hard-coat 21, and plastic substrate 22, as previously described. It also includes conductive layer 23, as previously described, but also includes yet another three layer stack 51, located between hard-coat 21 and plastic substrate 22. Layer 51 itself contains three layers: dielectric layers 52 and 54, and conductive metal layer 53. Although not shown, the five-layer, seven-layer or greater layer stacks depicted in FIG. 4 could replace either layer 51 or layer 23 in this configuration. Both conductive layers 51 and 23 are connected to conductors 55 and 24 respectively, for grounding.

The conductive layers 23 (and 51) are made up of continuous layers. Such layers can be laid down by sputter deposit and vacuum deposit techniques. From our experience, magnetron sputtering, as shown in S. Schiller, U. Heisig and K. Goedicke, *Thin Solid Films*, 54 (1978) 33; R. K. Waits, in J. L. Vossen and W. Kern (eds.), *Thin Film Processes*, Academic Press, New York, 1978, p. 131; J. A. Thornton and A. S. Penfold, in J. L. Vossen and W. Kern (eds.), *Thin Film Processes*, Academic Press, New York, 1978; and D. B. Fraser, in J. L. Vossen and W. Kern (eds.), *Thin Film Processes*, Academic Press, New York, 1978, which are incorporated herein by reference, is an excellent way to lay down precisely controlled layers.

The process for preparing the RFI/EMI shields of the present invention typically has the following steps. First, the hard-coat is applied to one side of the plastic substrate. Of course, if a conductive layer such as layer 51 is between the hard-coat and the plastic substrate, the hard-coat addition must be delayed. The hard-coat is applied first primarily for economy reasons. This is a relatively low cost material, so subsequent wastage is not as harmful as might be the case with more expensive steps. In the second step the dielectric-metal-dielectric layers are laid down. This can be done on a commercial scale in magnetron sputterers using various electrodes to lay down the various layers either one after another in a single pass, or by sequential passes through the sputtering apparatus. In this apparatus, the plastic substrate is generally fed as hard-coated roll stock. The hard-coated and conductive layer coated roll stock is then removed, cut into sheets corresponding to the size of the shields desired, and the sheets are then thermoformed to conform to the shape of the display tube. If the display tube is basically a flat panel, this shaping may only involve trimming the shield material to proper size. In the case of curved face display tubes, such as are conventional in CRT units, the shield can be thermoformed using conventional processes. These can include matched metal die pressing at effective thermoforming temperatures, such as from about 110 to about 150° C. in the case of carbonates, or from about 175 to about 250° C. in the case of polyesters. Other conventional processes include vacuum forming and pressure forming wherein the plastic substrate with attached layers is drawn or pressed into a mold by pressure or vacuum. These processes are carried out at essentially the same conditions as the matched die process just described.

An advantage of the shields of the present invention is their ability to be shaped to conform to display surfaces after the hard-coat and conductive shielding layer have been applied without disturbing or disrupting either of these layers. This allows for relatively inexpensive fabrication and permits a lower cost product to be achieved.

The shields of the present invention will be further described by the following examples. These are provided to illustrate embodiments of the invention, but are not to be construed as limiting the scope of the invention.

EXAMPLE 1

An EMI/RFI shield in accord with the present invention is prepared as follows:

First, polyester (poly(ethylene terphthalate)) roll stock is coated on one side with an acrylic diffuse nonglare hard-coat; the hard-coat is approximately 5 microns in thickness. The polyester has a nominal thickness of 15 mils. This material is then loaded into a magnetron sputterer and a three layer stack of dielectric, metal and dielectric is laid down. The dielectric layers each have a thickness of about 550 angstroms. The metal which is primarily silver has a thickness of about 200 angstroms, and the other dielectric layer is similar to the first. This conductive stack has a resistance of about 5 ohms per square. The conductive stack has a visual light transmittance of about 60%. The plastic substrate has neutral grey pigmenting, which gives it a visual transmittance of 40 to 50%, giving an overall transmittance level of 25 to 30%.

The product so formed is removed from the magnetron sputterer, cut into sheets, and the sheets are then formed and trimmed to conform to the face of a cathode ray tube by a pressure forming process. Silver ink buss bars are painted on the conductive layers and these are in turn adhered to copper mesh electrode surrounding essentially all 360° of the periphery of the shield. When the shield is examined visually it can be seen to present a continuous metal layer; this layer is transparent. It does not have any mesh lines or the like which can interfere with the visual image transmitted through the shield. When this shield is grounded it provides effective EMI/RFI shielding so as to prevent emissions of such radiation from the cathode ray tube and also to prevent entry of such radiation into the cathode ray tube.

EXAMPLE 2

The preparation of a shield as described in Example 1 is repeated with the following changes. The shield is designed for use in front of a flat panel display. Accordingly, the shield itself has a flat cross section and does not have the thermoforming called for in Example 1; the other change is that the conductive layer is provided as a five layer stack. The first, third and fifth layers are dielectric (metal oxide), the second and fourth layers are metal (primarily silver). The first and fifth layers are approximately 500 angstroms in thickness, the third layer is approximately 500 angstroms in thickness, and the second and fourth layers are each approximately 200 layers in thickness. This yields a product having an overall transmittance of about 50–70%. The overall conductive layer has a resistance of about 1 ohm per square and thus is even more effective in shielding that the material of Example 1.

EXAMPLE 3

The production of Example 1 is repeated with one change; instead of a neutral grey tinted polyester, an untinted polyester is used. This yields an overall transmittance of about 60% while retaining the excellent shielding characteristics of the material of Example 1.

What is claimed:

1. A transparent EMI/RFI shield for use in front of a visual display comprising:
   an outer layer of diffuse nonglare hard-coat;

an intermediate plastic substrate, said substrate being sized and shaped to conform to the visual display; and an inner conductive layer, said conductive layer comprising a continuous nonmesh metal film layer intermediate dielectric layers, said conductive layer having a transmittance over the visual spectrum of at least about 30% and having an electrical resistance of less than about 10 ohms per square, and said conductive layer being connected on substantially its entire periphery to a groundable conductor.

2. The transparent EMI-RFI shield of claim 1 wherein the plastic substrate is tinted or pigmented to give a transmittance between 30 and 100%.

3. The transparent EMI/RFI shield of claim 1 having a resistance of less than about 5 ohms per square.

4. The transparent EMI/RFI shield of claim 1 having a curved cross-section.

5. The transparent EMI/RFI shield of claim 1 having a flat cross-section.

6. The transparent EMI/RFI shield of claim 1 wherein the metal layer comprises a continuous nonmesh 100 to 500 angstrom layer of conductive metal.

7. The transparent EMI/RFI shield of claim 6 wherein the metal comprises silver.

8. A transparent EMI/RFI shield for use in front of a visual display comprising:
   an outer layer of diffuse nonglare hard-coat;
   an intermediate plastic substrate, said substrate being sized and shaped to conform to the visual display; and
   an inner conductive layer, said conductive layer comprising a plurality of continuous metal layers bounded by and separated by dielectric layers said conductive layer having a transmittance over the visual spectrum of at least about 30% and having an electrical resistance of less than about 10 ohms per square, and said conductive layer being connected on substantially its entire periphery to a groundable conductor.

9. The transparent EMI/RFI shield of claim 8 wherein the plurality is two.

10. The transparent EMI/RFI shield of claim 8 wherein the plurality is three.

11. The transparent EMI/RFI shield of claim 9 wherein the metal comprises silver.

12. The transparent EMI/RFI shield of claim 11 wherein the dielectric comprises metal oxide.

13. A transparent EMI/RFI shield for use in front of a visual display comprising:
   an outer layer of diffuse nonglare hard-coat;
   an intermediate plastic substrate, said substrate being sized and shaped to conform to the visual display; and
   two dielectric/continuous metal/dielectric conductive layers—one on either side of the plastic substrate said conductive layers each comprising a continuous metal film layer intermediate dielectric layers, said conductive layers having a transmittance over the visual spectrum of at least about 30% and having an electrical resistance of less than about 10 ohms per square, and said conductive layers being connected on substantially their entire periphery to a groundable conductor.

* * * * *